United States Patent [19]

Singh et al.

[11] Patent Number: 5,077,371

[45] Date of Patent: Dec. 31, 1991

[54] LOW FREE TOLUENE DIISOCYANATE POLYURETHANES

[75] Inventors: Ajaib Singh, Shelton; Robert J. Quint, Watertown; Ronald O. Rosenberg, Naugatuck, all of Conn.

[73] Assignee: Uniroyal Chemical Company, Inc., Middlebury, Conn.

[21] Appl. No.: 430,535

[22] Filed: Nov. 1, 1989

[51] Int. Cl.$^5$ ............................................. C08G 18/12
[52] U.S. Cl. ....................... 528/64; 528/65; 528/67
[58] Field of Search ....................... 528/64, 65, 67

[56] References Cited

U.S. PATENT DOCUMENTS 3,998,794 12/1976 Müller .................... 528/67

FOREIGN PATENT DOCUMENTS 2502934 1/1975 Fed. Rep. of Germany .
3343124 6/1985 Fed. Rep. of Germany .
3403500 11/1985 Fed. Rep. of Germany .
3418429 11/1985 Fed. Rep. of Germany .
122913 7/1983 Japan .

OTHER PUBLICATIONS

*Sint. Nov. Modif. Elastomerov* pp. 76–82, Belov et al., English Abstract Only (Russian) 1983.
Semendua et al., *Kauch. Rezina* (7) 24–26, English Abstract Only (Russian) 1985.

*Primary Examiner*—Maurice J. Welsh
*Assistant Examiner*—Rachel Johnson
*Attorney, Agent, or Firm*—Raymond D. Thompson

[57] ABSTRACT

A low-free toluene diisocyanate prepolymer is formed by reaction of a blend of the dimer of 2,4-toluene diisocyanate and an organic diisocyanate, preferably isomers of toluene diisocyanate, with high molecular weight polyols and optional low molecular weight polyols. The prepolymer can be further reacted with conventional organic diamines or organic polyol curatives to form elastomeric polyurethane/ureas or polyurethanes.

20 Claims, No Drawings

LOW FREE TOLUENE DIISOCYANATE POLYURETHANES

BACKGROUND OF THE INVENTION

This invention relates to elastomeric polyurethane and/or polyurethane/urea products and more particularly to an effective process for lowering residual free aromatic polyisocyanates in prepolymers by incorporation of 2,4- toluene diisocyanate dimer into the prepolymer.

Aromatic polyisocyanates are well known and are widely used in the preparation of polyurethane and poly urethane/urea elastomers. These aromatic diisocyanates generally include compositions such as 2,4-toluene diisocyanate, 2,6-toluene diisocyanate, 4,4'-methylene bis (phenylisocyanate) and the like. In the preparation of polyurethane and polyurethane/urea elastomers, the aromatic diisocyanates are reacted with a long chain (high molecular weight) polyol to produce a prepolymer containing free isocyanate groups which then may be chain extended with a short chain (low molecular weight) polyol or aromatic diamine to form a polyurethane or polyurethane/urea elastomer. Long chain, high molecular weight polyols, e.g. those having a molecular weight of above 250, are generally utilized to form the prepolymer and the chain extender is generally a short chain polyol, e.g., $C_2$-$C_{10}$ polyol, or an aromatic diamine. The long chain, high molecular weight polyol provides flexibility and elastomeric properties to the resin, while the short chain polyol or aromatic diamine provides chain extension or cross-links and adds toughness and rigidity to the resulting elastomeric polymer.

A major problem with mononuclear aromatic diisocyanates, e.g., toluene diisocyanate is that they are toxic and because of their low molecular weight tend to be quite volatile. Because of their toxicity and volatility, extreme care must be taken in the workplace to avoid inhalation and damage to the respiratory tract and contact with the skin.

It is known that residual toluene diisocyanate (free toluene diisocyanate) in prepolymer can be reduced by reducing the isocyanate/hydroxyl ratio of the prepolymer formulation. This method, however, has a detrimental consequence on processing when the prepolymer is chain extended (or cured), namely, the hardness build up rate decreases very significantly which leads to too long a demold time.

Economically, short demold times are very important. Once the reactants are mixed and poured into a mold, it is desirable to remove the product from the mold as soon as possible. The product must have sufficient strength to be handled and normally have sufficient strength to be employed in its intended purpose; however, the physical properties, if desired, usually can be improved by postcuring at elevated temperatures.

Surprisingly, it has been found that by incorporating 2,4 TDI dimer in the prepolymer, low NCO/OH ratio can be used to obtain the desired low residual free toluene diisocyanate content while maintaining the desired hardness build up rate. This additive is the dimer of toluene diisocyanate which is commercially known as Desmodur ™ TT available from Mobay Chemical Company.

There is some literature on the use of 2,4-toluene diisocyanate dimer in polyurethanes. Semenova, E. P. et al. USSR, *Kauch Rezina* 1985, (7) 24-6, disclose that an amorphous thermoplastic elastomer from adipic acid-1,4-butanediol - ethylene glycol - 2,4-toluene diisocyanate copolymer was post-treated with 2,4-toluene diisocyanate dimer. This led to the formation of allophanate crosslinks and to increased elasticity modulus and energy capacity. The dimer acted not only as a vulcanizing agent, but also as a filler. 2,4-toluene diisocyanate dimer was used in combination with peroximon F40 (a peroxide) (forming strong bonds) and triallyl cyanurate.

Unlike the instant invention, Semenova et al used the TDI-Dimer as a vulcanizing agent and filler for a finished thermoplastic elastomer. It has been unexpectedly and surprisingly found that when TDI-Dimer is utilized in a prepolymer the free TDI-level may be significantly reduced demoldability, in that prepolymer, while maintaining good cure rates and characteristics.

SUMMARY OF THE INVENTION

In the practice of this invention, an organic diisocyanate and the dimer of toluenediisocyanate are reacted with high molecular weight aliphatic polyester or polyether polyols to produce a prepolymer having the TDI below 0.4% by weight. Optionally a mixture of a low Mw polyol (Molecular weight<250) and a high Mw polyol (Molecular weight>250) may also be reacted with the diisocyanate and the dimer of toluene diisocyanate.

Representative toluenediisocyanates include the two main isomers, i.e., the 2,4- and the 2,6-diisocyanate and optionally, a small amount of the ortho isomers, the 2,3- and 3,4-isomers. Commercially, toluenediisocyanate is found as a 65:35, 80:20 or 99:1 isomer mix of the 2,4- and 2,6-isomer by weight and optionally from 0-5% by weight of the ortho isomers. An isomer mix is preferred within a range, e.g., from 65-100% of the 2,4-isomer and the balance, i.e., 0-35% being essentially the 2,6-isomer. The most preferred range of the 2,6-isomer is 0-5%. Other useful organic diisocyanates are those known conventionally such as MDI, CHDI, H12MDI, PPDI, IPDI, etc.

The 2,4-toluenediisocyanate dimer may be added to the selected organic diisocyanate(s) in an amount ranging up to the dimer s solubility limit at about 80° C. to form the isocyanate blend. Preferably the dimer is present at about 0.3% to about 6.0% by weight of the isocyanate blend, that is, toluene diisocyanate dimer and the organic diisocyanate. More preferably 0.5 to 4.0% of dimer is present.

High Mw polyols, namely polyether polyols or polyester polyols having a number average molecular weight of at least 250, are used to prepare the prepolymer of the instant invention. Molecular weight of about 650 to 3000 is preferred, with molecular weight of 1000 being the most preferred. However, the molecular weight of the high Mw polyol may be as high as 10,000 or as low as 250. The preferred polyalkyleneether polyols may be represented by the general formula HO(-RO)$_n$H, wherein R is an alkylene radical and n is an integer large enough that the polyether polyol has a number average molecular weight of at least 250. These polyalkyleneether polyols are well-known components of polyurethane products and can be prepared by the polymerization of cyclic ethers such as alkylene oxides and glycols, dihydroxyethers, and the like by known methods.

The polyester polyols are prepared by reaction of dibasic acids (usually adipic acid but other components such as sebacic or phthalic acid may be present) with diols such as ethylene glycol, 1,2-propylene glycol, 1,4-butylene glycol and diethylene glycol, etc., where linear polymer segments are required, or include units of higher functionality such as glycerol, trimethylol propane, pentaerythritol, sorbitol, etc., if chain branching or ultimate cross-linking is sought. Some polyester polyols also employ caprolactone and dimerized unsaturated fatty acids in their manufacture. Another type of polyester which is of interest is that obtained by the addition polymerization of e-caprolactone in the presence of an initiator. Other polyols that can be used are those that have at least two hydroxyl groups and whose basic backbone is obtained by polymerization or copolymerization of such monomers as butadiene and isoprene monomers.

The total polyol blend portion of the instant invention can be combination of high Mw polyol, as previously described, and a low molecular weight polyol. An aliphatic glycol is the preferred low molecular weight polyol. Suitable aliphatic polyols are ethylene glycol, diethylene glycol, dipropylene glycol, neopentyl glycol, 1,3-butanediol, 1,4-butanediol, and the like. The most preferred low molecular weight polyol is 1,4-butanediol. In general, the weight of the low molecular weight polyol should be no more than 20% of the combination of high molecular weight polyol and low molecular weight polyol. The preferred range is 0 to 15% of the combination; more preferred is 0–8%.

The prepolymers are prepared by dissolving 2,4-toluene diisocyanate dimer in any conventional diisocyanate, adding the polyol or polyol blend, maintaining the temperature from room temperature to temperatures as high as 150° C. for times necessary to react all the available hydroxyl groups. Preferred reaction temperatures are 50° C. to 100° C.; more preferred are 50° C. to 85° C. The product is poured into containers under a nitrogen flush and stored at room temperature.

An alternate method is to generate the dimer of toluene diisocyanate in situ. A dimerization catalyst, such as one of the trialkyl phosphines or other conventional materials, is added to toluene diisocyanate prior to adding the polyols. Another alternative is to generate the dimer in the diisocyanate by heating to the dimerization temperature without use of a catalyst.

The curative used for the prepolymer can be selected from a wide variety of conventional and well known organic diamine or polyol materials. Preferred materials are the aromatic diamines which are either low melting solids or liquids. Specifically preferred are the diamines or polyols having a melting point below 120° C. If melting point is above 120° C., then plasticizers may be used to lower the effective melting point of the curative. These diamines or polyols are generally the present ones used in the industry as curative for polyurethane. The selection of a curative is generally based on reactivity needs, or property needs for a specific application, process condition needs, and pot life desired. Of course, known catalysts may be used in conjunction with the curative.

Representative of the most preferred materials are: 4,4'-methylene-bis(3-chloro)aniline (MBCA), 4,4'-methylene-bis(3-chloro-2,6-diethyl)aniline (MCDEA), diethyl toluene diamine (DETDA), tertiary butyl toluene diamine (TBTDA), dimethylthio-toluene diamine (Ethacure TM 300) from Ethyl Corporation, trimethylene glycol di-p-aminobenzoate (Polacure TM 740) from Polaroid Corporation, and 1,2-bis(2-aminophenylthio)ethane (Cyanacure form American Cyanamid Company).

The stoichiometric ratio of isocyanato groups to hydroxyl groups in the reactants should preferably be from 1.3/1 to 1.9/1 although somewhat lower and higher ratios are permissible. When the ratio is much lower, the molecular weight of the isocyanato terminated polyurethane becomes so large that the viscosity of the mass makes mixing of chain extenders into the prepolymer relatively more difficult. At the other extreme, a ratio of 2 isocyanato groups to one hydroxyl group is the theoretical ratio for the end-capping of a polyalkyleneether or ester polyol with a diisocyanate. An excess approaching the 2/1 ratio will result in high levels of free diisocyanate in the mixture. Therefore, the preferred range is I.4/1 to 1.6/1.

For curing these prepolymers, the number of $-NH_2$ groups in the aromatic diamine component should be approximately equal to the number of $-NCO$ groups in the prepolymer. A small variation is permissible but in general from about 80 to 110% of the stoichiometric equivalent should be used, preferably about 85 to 100%.

The reactivity of isocyanato groups with amino groups varies according to the structure to which the groups are attached. As is well known, as for example in U.S. Pat. No. 2,620,516, some amines react very rapidly with some isocyanates while others react more slowly. In the latter case, it is optional to use catalysts to cause the reaction to proceed fast enough to make the product non-sticky within 30–180 seconds. For some of the aromatic diamines, the temperature of the reaction or of the polyurethane reactant will need only be controlled in order to obtain the proper reaction time; thus, for a diamine that ordinarily would be too reactive, a catalyst would obviously be unnecessary, a lowering of the reaction temperature would suffice. A great variety of catalysts is available commercially for accelerating the reaction of the isocyanato groups with compounds containing active hydrogen atoms (as determined by the well-known Zerewitinoff test). It is well within the skill of the technician in this field to pick and choose catalysts to fit his particular needs or desires and adjust the amounts used to further refine his conditions. Adipic acid and triethylene diamine (available under the trademark Dabco TM) are typical of suitable catalysts.

The following examples are illustrative of the present invention and are therefore not intended as a limitation on the scope thereof.

EXAMPLE 1

Preparation of low NCO/OH Ratio (1.5/1.0) Prepolymer

A prepolymer is prepared under nitrogen in a reactor by slowly adding, with stirring, 0.67 parts of toluene diisocyanate dimer (Desmodur TT) to 36 parts of 2,4-toluene diisocyanate at 55°–60° C. The temperature is maintained until the powder is dissolved. A clear solution results. Then 85 parts of polytetramethyleneether glycol of molecular weight 1000 (PTMG-1000) and 3.15 parts of 1,4-butanediol are added slowly such as to keep the temperature below 85° C. The reaction is continued for two hours at 80±5° C. The product is poured into containers under nitrogen flush and stored at room temperature overnight. After 16 hours the percent isocyanate (NCO) is determined.

EXAMPLE 2

Preparation of Low NCO/OH Ratio (1.5/1.0) Prepolymer

This prepolymer was formed by use of a method analogous to that described in Example 1, except 1.3 parts of toluene diisocyanate dimer (Desmodur TT) was substituted for the 0.67 parts of toluene diisocyanate dimer.

COMPARATIVE EXPERIMENT A

Preparation of Low NCO/OH Ratio (1.5/1.0) Prepolymer

Again, in this comparative experiment, the prepolymer was prepared by use of a method analogous to that described in Example 1, except no toluene diisocyanate dimer was added.

The effect of toluene diisocyanate dimer on processing of prepolymer is found in Table 1.

The effect of the toluene diisocyanate dimer in increasing the Hardness Build Up rate is dramatically demonstrated. Comparative Experiment A shows a Shore A Hardness value of 5 in 15 minutes compared to 78 and 82 for Examples 1 and 2, respectively.

Products with a Shore A hardness of 40 to 50 are judged, in practice, to be demoldable readily.

TABLE I

EFFECT OF TOLUENE DIISOCYANATE DIMER ON PROCESSING OF PREPOLYMERS
(NCO/OH of Prepolymers at 1.5/1.0, Total Polyol Blend Molecular Weight 520, 99% 2,4-toluene diisocyanate

| Example or Comparative Experiment | A | 1 | 2 |
|---|---|---|---|
| Toluene diisocyanate dimer (Parts per 100 toluene diisocyanate) | 0.0 | 1.86 | 3–72 |
| Prepolymer Properties | | | |
| Viscosity at 100° C. (poise) | 7 | 8.5 | 7 |
| % Free TDI (Total 2,4- + 2,6- isomer) | 0.06 | 0.08 | 0.09 |
| Cured with MBCA at 95% Theory; Prepolymer at 70° C., MBCA at 116° C. | | | |
| Pot Life (time at which viscosity reaches to 100 P) | 4.0' | 3.5' | 3.0' |
| (time at which viscosity reaches to 200 P) | 5.0' | 4.0' | 3.3 |
| Hardness Build Up (Shore A) | | | |
| 15 Minutes | 5 | 78 | 82 |
| 20 Minutes | 43 | 80 | 87 |
| Final (16 hrs. at 100° C.) | 96 | 96 | 96 |

EXAMPLE 3 AND COMPARATIVE EXPERIMENT B

Additional examples were prepared following the procedures outlined in Example 1 and Comparative Experiment A.

The effect of toluene diisocyanate dimer on physical properties of urethanes appears in Table II. The results clearly show that the physical properties of the elastomer produced are not significantly changed.

Various changes and modifications are easily thought of by the skilled artisan, and are within the scope of the invention if they are within the scope of the following claims.

TABLE II

EFFECT OF TOLUENE DIISOCYANATE DIMER ON PHYSICAL PROPERTIES OF URETHANES
(NCO/OH 6 of Prepolymers at 1.5/1.0, Total Polyol Blend Mw 734, 99% 2,4-toluene diisocyanate

| Example or Comparative Experiment | B | 3 |
|---|---|---|
| Toluene diisocyanate dimer (Parts per 100 toluene diisocyanate) | 0 | 0.97 |
| % NCO | 4.0 | 4.0 |
| Shore A Hardness | 94 | 94 |
| Modulus (psi) at: | | |
| 100 Elongation | 1290 | 1110 |
| 200 Elongation | 1900 | 1600 |
| 300 Elongation | 3100 | 2650 |
| Tensile - (PSI) | 5860 | 5600 |
| Percent Elongation | 380 | 390 |
| Bashore Rebound | 35 | 37 |
| Compression Set, % | 21 | 24 |
| Tear C pli | 473 | 550 |
| Split Tear, pli | 90 | 104 |
| Compressive Moduli, psi | | |
| 5% | 300 | 300 |
| 10% | 480 | 470 |
| 15% | 650 | 717 |
| 20% | 920 | 950 |
| 25% | 1385 | 1420 |

We claim:

1. An organic diisocyanate prepolymer comprising the reaction product of:
   (a) an isocyanate blend of 0.3 to 6.0 weight percent of a dimer of 2,4-toluene diisocyanate with 94 to 99.7 weight percent of an organic diisocyanate; and
   (b) a polyol blend of 0-20 weight percent of a low molecular weight polyol having a molecular weight below 250 and 80-100 weight percent of a high molecular weight polyol having a molecular weight of at least 250 selected from the group consisting of polyether polyols and polyester polyols.

2. A prepolymer in accordance with claim 1 wherein said organic diisocyanate is selected from the group consisting of toluene diisocyanate, 4,4'-methylene bis (phenylisocyanate) and cyclohexyldiisocyanate.

3. A prepolymer in accordance with claim 1 wherein organic diisocyanate is 2,4-toluene diisocyanate, 2,6-toluene diisocyanate or mixtures thereof.

4. A process in accordance with claim 1 wherein said low molecular weight polyol is an aliphatic polyol.

5. A prepolymer in accordance with claim 1 wherein said high molecular weight polyol is a polyalkyleneether polyol or polyester polyol having a molecular weight between about 650 and about 3000.

6. A prepolymer in accordance with claim 1 wherein said low molecular weight polyol is present between 0 and 8 weight percent of said polyol blend.

7. A prepolymer in accordance with claim 1 wherein said high molecular weight polyol is polytetramethylene glycol.

8. A process for making a low-free toluene diisocyanate prepolymer comprising the steps of:
   (a) preparing a solution containing at least 0.3 weight percent of the dimer of 2,4-toluene diisocyanate in an aromatic diisocyanate to form an isocyanate blend;
   (b) adding a high molecular weight polyol selected from the group consisting of polyalkyleneether polyol and polyester polyol, with or without a low molecular weight polyol, to said isocyanate blend to form a reaction mixture; and (c) reacting said reaction mixture between 50° and 150° C. for a time sufficient to form said prepolymer having a free toluene diisocyanate level less than 0.4 percent.

9. A process according to claim 8 wherein said aromatic diisocyanate is 2,4- or 2,6-toluene diisocyanate or mixtures thereof.

10. A process according to claim 8 wherein said high molecular weight polyol is a polyalkyleneether polyol and said low molecular weight polyol is an aliphatic polyol.

11. A process according to claim 8 wherein said high molecular weight polyol is polytetramethyleneether glycol.

12. A process for making a low-free toluene diisocyanate prepolymer comprising the steps of:
   (a) adding in sufficient quantity a dimerization catalyst to an aromatic diisocyanate blend containing 2,4- or 2,6-toluene diisocyanate and mixtures thereof at elevated temperatures of up to 150° C. to form from 0.3 to about 6 parts by weight of a dimer of 2,4-toluene diisocyanate, insitu, thereby, forming an isocyanate/dimer blend; and
   (b) adding to said isocyanate/dimer blend a polyol blend of 0-20 weight percent of a polyol having a molecular weight below 250 and 80-100 weight percent of a polyol having a molecular weight of at least 250 selected from the group consisting of polyester polyol and polyether polyol;
   (c) reacting said polyol blend and isocyanate blend for a time sufficient to form a prepolymer having less than 0.4% free-toluene diisocyanate.

13. A process according to claim 12 wherein said dimerization catalyst is a trialkylphosphine, said organic diisocyanate is an isomer mixture of 2,4-and 2,6-toluene diisocyanates, and said high molecular weight polyol is a polyalkylene ether glycol.

14. A process according to claim 12 wherein said high molecular weight polyol is polytetramethylene ether glycol and said low molecular weight polyol is 1,4-butanediol.

15. A process of making a polyurethane elastomer from a low-free toluene diisocyanate prepolymer comprising:
   reacting a low-free toluene diisocyanate prepolymer with an aromatic diamine or polyol curative, said prepolymer being formed as the reaction product of an isocyanate blend of 0.3 to 6.0% weight percent of a dimer of 2,4-toluene diisocyanate with 94 to 99.7 weight percent of an organic diisocyanate, and a polyol blend of 0-20 weight percent of a low molecular weight polyol having a molecular weight below 250 and 80-100 weight percent of a high molecular weight polyol having a molecular weight of at least 250 selected from the group consisting of polyester polyol and polyether polyol.

16. A process according to claim 15 wherein said organic diisocyanate is a mixture of the 2,4- and 2,6 isomers of toluene diisocyanate.

17. A process in accordance with claim 15 wherein said high molecular weight polyol is a polyalkylenether glycol having a molecular weight between about 650 and about 3000.

18. A process in accordance with claim 15 wherein said low molecular weight polyol is present between 0 and 8 weight percent of said polyol blend.

19. A process in accordance with claim 15 wherein said high molecular weight polyol is polytetramethylene ether glycol.

20. A process for making a low-free toluene diisocyanate prepolymer comprising the steps of:
   (a) heating an aromatic diisocyanate blend containing 2,4- or 2,6-toluene diisocyanate and mixtures thereof at elevated temperatures of up to 150° C. to form from 0.3 to about 6 parts by weight of a dimer of 2,4-toluene diisocyanate, insitu, thereby, forming an isocyanate/dimer blend; and
   (b) adding to said isocyanate/dimer blend a polyol blend of 0-20 weight percent of a polyol having a molecular weight below 250 and 80-100 weight percent of a polyol having a molecular weight of at least 250 selected from the group consisting of polyester polyol and polyether polyol;
   (c) reacting said polyol blend and isocyanate blend for a time sufficient to form a prepolymer having less than 0.4% free-toluene diisocyanate.

* * * * *